United States Patent [19]

Phillips

[11] Patent Number: 5,049,797
[45] Date of Patent: Sep. 17, 1991

[54] DEVICE AND METHOD FOR CONTROL OF FLEXIBLE LINK ROBOT MANIPULATORS

[75] Inventor: Warren F. Phillips, Logan, Utah

[73] Assignee: Utah State University Foundation, Logan, Utah

[21] Appl. No.: 546,924

[22] Filed: Jul. 2, 1990

[51] Int. Cl.⁵ .............................................. B65B 21/02
[52] U.S. Cl. ............................ 318/568.16; 318/568.2; 318/568.24; 364/513; 901/9; 901/47; 414/730
[58] Field of Search ................................. 318/560–646; 364/513; 901/3, 6, 9, 12–23, 46, 47, 48; 414/730, 731, 732, 735; 356/152

[56] References Cited

U.S. PATENT DOCUMENTS

| | | | |
|---|---|---|---|
| 4,570,065 | 2/1986 | Pryor | 901/47 X |
| 4,593,191 | 6/1986 | Alles | 901/47 X |
| 4,798,461 | 1/1989 | Pavlin et al. | 901/47 X |
| 4,808,064 | 2/1989 | Bartholet | 901/9 X |
| 4,833,624 | 5/1989 | Kuwahara et al. | 318/568.2 |

*Primary Examiner*—Paul Ip
*Attorney, Agent, or Firm*—Thorpe, North & Western

[57] ABSTRACT

A method and device for controlling and dampening undesirable vibrational movement within flexible linkage of a robot arm coupled to a movable, controlled joint and attached drive motor. The method includes the steps of providing position displacement and control in accordance with position and velocity feedback input. In addition, elastic deflection arising within the robot arm is detected and a time-dependent deflection signal proportional to the degree of elastic deflection is generated. A control algorithm develops deflection feedback signals for input to the robot arm which are approximately proportional to the deflection signal and its first two time derivatives, each multiplied by a gain whose value is selected to reduce further elastic deflection. This procedure is applied within flexible robot arm structure by incorporating elastic deflection detection components and by converting the detected deflection signal to deflection feedback signals for application to the drive system of the robot arm. Elastic deflections arising upon movement of the flexible arm structure are almost immediately nullified and the robot arm is allowed to reposition itself without interference from such undesirable forces and resultant robot arm movement.

17 Claims, 11 Drawing Sheets

DEVICE AND METHOD FOR CONTROL OF FLEXIBLE LINK ROBOT MANIPULATORS

BACKGROUND OF THE INVENTION

1. Field of Invention

This invention relates to devices and methods for enabling use of light weight components as part of a robot manipulator system. More specifically, the present invention involves the use of control devices and methods for reducing unwanted elastic vibration or repeated deflection within the robot linkage.

2. Prior Art

The control systems used in current industrial robots are generally based on the assumption that all links which guide the robot manipulators are structurally rigid throughout the course of movement. Specifically, these control systems do not account for the occurrence of elastic deflection or other vibrational movement which could occur if the links making up the robot are or not absolutely rigid. Accordingly, such control systems presume that the only movement within the robot arm is that which is the result of controlled movement actuated by a computer or other form of robot drive system, modified by error correction algorithms and methods which are designed to re-orient the robot manipulator with respect to a particular frame of reference. Included within such movements would be allowances for tolerance within connecting joints and robot drive systems.

In order to force manipulators to conform to the rigid link model which dominates current robot technology, industrial robots are generally built with very stiff links. In order to maintain this stiffness, link components are typically very massive. For example, a survey of industrial robots presently on the market shows an average robot-to-payload weight ratio of about 50. This means that a robot capable of handling a 50 pound load would weight in excess of one ton. By utilizing these stiff and massive links, elastic vibration or deflection within the robot manipulator is maintained at substantially nominal levels.

Although current trends favoring heavy construction of massive robot linkage avoids introduction of elastic deflection and other unwanted movement within the robot structure, such heavy construction extracts a heavy price, not only in cost of robot structures and drive systems, but also large space and support requirements. Therefore, robotic equipment in industrial applications is generally very expensive and requires substantial operating space, further increasing overhead costs. As a consequence, the availability of robotic devices for general use of both large and small manufacturing operations has been limited. Only the largest of industries have generally been able to afford robotic systems to support their manufacturing operations. The extreme weight and high cost of robot devices have precluded expansion of robotics into the small business arena, and particularly within the consumer market.

In addition to conventional applications of robots, the need for robot manipulators in outer space has opened a whole new field of application. Unfortunately, here the extreme weight of conventional robot manipulators poses serious problems to the space industry which must transport such robots into orbit. The large mass and extensive size requirements of current robot manipulators translates into high dollar cost as payload in an orbital spacecraft. Nevertheless, it is common knowledge that robotic devices fulfill a unique role in exploring and conquering the challenges of extra-terrestrial travel and development.

The development of a manipulator control system capable of accurately controlling a robot with lightweight flexible links has been recognized as an important step in the technical development of low cost robots that can be applied in small industry and by the private consumer. Unfortunately, lightweight robots are generally characterized by flexible links. Such flexible links experience large elastic vibrations which are induced by inertial forces affecting the robot links during movement. Such vibrations make it very difficult to perform tasks quickly. The current solution to this problem has been to move the robot linkage very slowly, or to wait for long periods of time between movements to allow the induced vibrations to dampen out. Some efforts to enhance this dampening process have been applied to robot linkage, such as wrapping the linkage with a sheath or other flexible material to absorb the vibrational movement developed within the robot arm or manipulator. None of these techniques has been acceptable. The high robot-to-payload weight ratio remains a major hurdle in advancing the robotics industry to its next stage of economic development and commercial acceptance for wide scale application.

OBJECTS AND SUMMARY OF THE INVENTION

It is an object of the present invention to provide a control system and method for reducing elastic deflection and vibration within a robot manipulator which is constructed of lightweight, flexible links.

It is a further object of the present invention to provide a system and method for enabling the use of a lightweight robot which is capable of quick movement without need for waiting periods otherwise required to allow elastic vibrations to dampen.

A still further object of the present invention is to provide a control system which is capable of implementation in virtually any environment, including both gravity and gravity-free applications.

Yet another object of the present invention is to provide a control system for facilitating use of lightweight, flexible robot linkage without incurring high cost or extensive control devices and equipment to accomplish this result.

These and other objects are realized in a method for controlling and dampening undesirable vibrational movement within flexible linkage of a robot arm which is coupled to a movable, controlled joint and attached drive motor. This method comprises the ongoing steps of (i) determining the position displacement required to move the robot arm from its current position to a desired position, (ii) activating the drive motor to reposition the robot arm to the desired position, (iii) generating a position feedback signal to enable adjustment of the changing positions of the robot arm to efficiently move the arm toward the desired position, (iv) detecting any elastic deflection arising within the robot arm, (v) generating a time-dependant deflection signal proportional to the degree of elastic deflection of the previous step, (vi) generating a deflection feedback signal for input to the robot arm wherein the deflection feedback signal is approximately proportional to the deflection signal, multiplied by a gain whose value is selected to reduce further elastic deflection of the robot arm, and (vii) applying the deflection feedback signal to the robot arm to reduce further elastic deflection. Also disclosed is a device for accomplishing the above method objectives.

This device includes detecting means coupled to the robot arm, drive motor and a computer control system for detecting elastic vibration arising within a robot arm. A deflection signal generating means is coupled to the detecting means and operates to generate a deflection signal dependent in value upon the degree of elastic deflection within the robot arm. A deflection feedback means associated with the computer control system generates a deflection feedback signal proportional to the deflection signal, multiplied by a gain whose value is selected to reduce further elastic deflection within the robot arm. This signal is introduced into the robot arm by counter displacement means for reducing further deflection.

Other objects and benefits of the present invention will be apparent to those skilled in the art based upon following detailed description, taken in combination with the accompanying drawings.

DETAILED DESCRIPTION OF THE INVENTION

Figure 1:
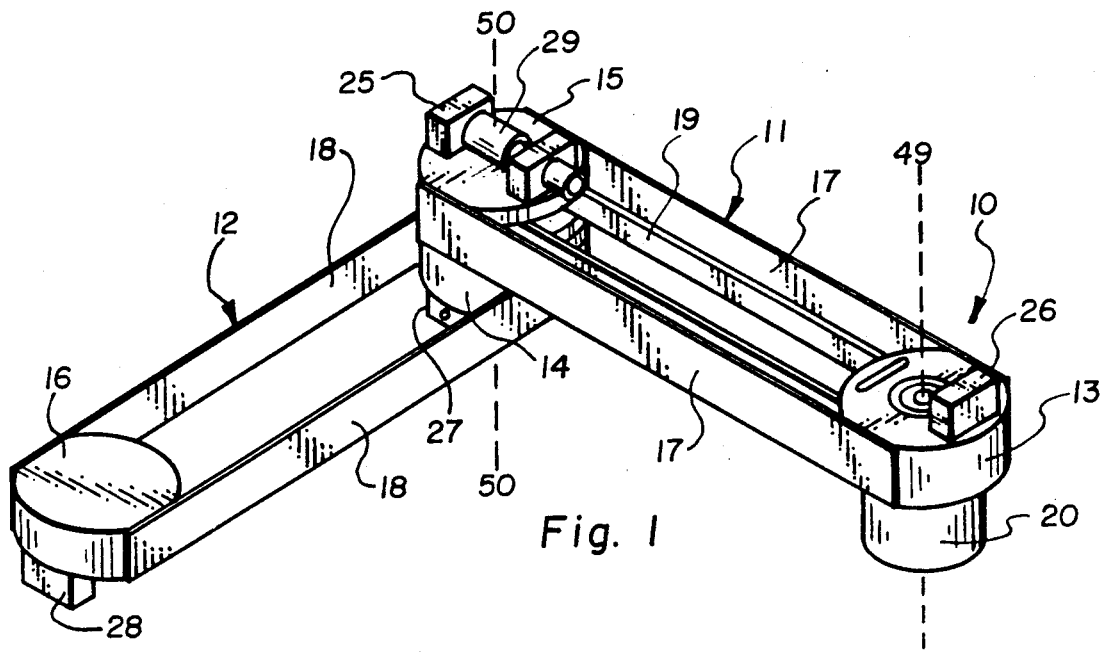
FIG. 1 shows a perspective view of a two axis experimental robot arm embodying the present invention.

In a conventional robot control system, position and velocity feedback are applied with respect to each joint to accurately manipulate the robot arm to its desired location. Typically, a computerized drive system determines the position displacement required to move the robot arm from its current position to the desired position, activating a drive motor to implement this repositioning step. The position feedback signal enables adjustment of the changing positions of the robot arm to efficiently move the robot arm toward its desired new position. Similarly, a velocity feedback signal may be used in conjunction with the position feedback signal to more effectively control the rate of change of movement for the robot arm in displacing this arm to its desired position.

Typically, the voltages applied as part of this feedback control loop are proportional to the difference between a desired position and the actual position, or the desired velocity and the actual velocity. These are controlled by a proportionality constant or gain factor. As long as there is a difference, the feedback control loop adjusts the velocity and movement in accordance with this relationship. When there is no difference between actual and desired positions or velocities, no motor voltage is applied and the robot arm is theoretically in position.

In prior art robots where a large robot mass-to-payload weight exists (50 to 1) there is little deflection of the rigid robot arm. In a lightweight, flexible robot arm, however, the initial movement of the robot arm will result in an inertial deflection of the flexible arm structure. This is referred to herein as elastic deflection and occurs as the movement of the end of the arm is delayed with respect to the stiffer arm structure near the motor which drives the joint and attached arm. This elastic deflection may actually generate an oscillation within the robot arm which makes control of the robot arm positioning virtually impossible until oscillating movement is dampened or otherwise subsides. Similar deflection can be caused by external forces such as gravity where the robot arm is displaced to a static position by reason of the force applied to the flexible arm component. Both of these types of deflections may be controlled by implementation of a deflection feedback loop in accordance with the present invention.

In general terms, "deflection feedback" involves slowing the drive motor to allow the inertial deflection to catch up with robot arm movement. Deflection feedback is triggered with an inertial movement of the flexible arm and the resultant elastic deflection, generating a second deflection force introduced by means of the control motor which force is 180 degrees out of phase with the inertial elastic deflection initially occurring within the robot arm. Accordingly, this initial elastic deflection is cancelled by imposition of a corresponding, opposing deflection imposed by the drive motor of the robot. These are continuously applied to quickly dampen elastic vibrations as they occur, and before oscillation can develop within the robot arm.

FIG. 1 illustrates a two axis robot arm of flexible link construction. This two axis robot arm 10 includes two link sections 11 and 12. Each section comprises a control joint 13, 14, a distal support member 15 and 16, and intermediate support arms 17 and 18.

Link 11 is referred to herein as the primary link and is coupled at its control joint 13 to a drive motor 20, whose output is controlled by a computer and control algorithm which regulates robot arm movement, feedback controls and orientation. Angular movement of joint 13 is accomplished by direct gear or transmission between a drive motor 20 and joint structure 13. This provides controlled movement of the primary link, including its support member 15.

Movement of the distal link 12 is accomplished by use of a drive band 19 which is coupled to a second drive motor (not shown). This drive belt 19 engages a rotor wheel (not shown) which is coupled to a second shaft mounted on joint 14. This rotor wheel applies the appropriate rotational force to the joint 14 of the distal link 12. This transmission of rotational force is accomplished by coupling the drive belt 19 to a rotary wheel rigidly mounted to the rotational axis of the joint 14 such that any displacement in the drive belt 19 causes corresponding rotational displacement of the second drive wheel and its attached joint 14.

Further discussion of the technical construction of such a rotary wheel/drive belt assembly is deemed unnecessary in view of its common application within robotics. It is important, however, that the drive system have capacity to respond to very slight movements of the drive motor 20 such that even slight deviations in movement are effectively transmitted from the drive motor 20 through the drive belt 19 into the distal link 12. This can be accomplished, for example, by use of a rotary wheel having a geared configuration, with a drive belt 19 being indexed with repeated gear-engaging tread elements (not shown).

As previously indicated, the support arms 17 and 18 connecting the respective elements of the robot links 11 and 12 will incur a degree of elastic deflection upon rotary movement of either joint 13 or 14. The degree of deflection depends upon the mass of the support arm structure, the load carried by the distal support members 15 and 16, and the stiffness of the support arms 17 and 18.

In the embodiment illustrated in FIG. 1, the support arm structure 17 and 18 has purposely been constructed to generate significant elastic deflection upon movement of the robot arm. In the illustrated case, the support arms comprise opposing slats of aluminum, steel or other suitable material which is readily susceptible to vibrations, oscillations and deflection generally arising from inertial response of the robot arm mass. The low moment of inertia posed by the respective support arms 17 and 18 exaggerate the degree of elastic deflection for purposes of evaluation and testing of the subject invention.

It will be apparent to those skilled in the art that commercial robot construction would endeavor to minimize elastic deflection, even incorporating the principles of the present invention. This would be done by developing high modulus, high moment of inertia design in the respective support arm structures 17 and 18, as well as by incorporation of design characteristics which reduce the likelihood of elastic deflection. Therefore, it is to be understood that the construction adopted in the illustrated embodiment represents an extreme case of elastic deflection. The effectiveness of the present invention when applied to such extreme structural design lends greater credibility to the application of these inventive principles to more commercially acceptable robot construction having what the industry would generally term as "flexible" linkage.

Implementation of the present invention requires an accurate system for detecting elastic deflection in each link. Numerous systems for measuring such deflection will be apparent to those skilled in the art, including the use of strain gauges displaced along the length of the support arms 17 and 18, optical systems which monitor changing positions of a projected beam of light, as well as other means which is capable of registering even slight displacement of the flexible link structure arising by means of external forces or movement of the joint as has been previously discussed.

The robot arm illustrated in FIG. 1 is therefore configured with two revolute joints 13 and 14 which respectively move their links 11 and 12 in the horizontal plane. For simplicity, the links were constructed to be flexible in the horizontal direction, but rigid in the vertical direction. This design allows the control system to be tested with the use of only two control loops, making the initial testing less costly. Each link is driven by a Baldor model MTE-4090-B DC Servo Motor. This motor is controlled using a Galil m model DMC-200 controller and a Motion Science model HB-8016-2 Mosfet PWM amplifier.

Each link of the arm was fitted with independent position and velocity sensors to provide feedback to the control loop. A Baldor model MS-3102A-24-7-P optical encoder was used for joint position feedback and a Baldor model MTE-4090-FL-3B tachometer was used to provide the joint velocity feedback. Further discussion of the position and velocity feedback controls, and other conventional hardware used with the illustrated embodiment is deemed unnecessary in view of the fact that such structure is well documented in the literature. Similarly, the techniques for incorporating position and velocity feedback within a control loop are well known.

With the flexible support arm structure 11 and 12, it will be clear to those skilled in the art that the illustrated robot arm would be useless in a conventional application. Any movement of either revolute joint 13 or 14 would generate inertial deflection which would set the respective links into oscillation. I& has been discovered, however, that by adding an additional feedback loop, such elastic deflection can be essentially neutralized. Surprisingly, it has been discovered that elastic deflection can be efficiently and rapidly eliminated in the extreme flexible linkage illustrated in FIG. 1, without adding complicated structure or expensive control circuits to accomplish this task. This is accomplished by developing a deflection feedback loop, in addition to the position and velocity feedback systems. The output of this deflection feedback loop is fed to the drive motor 20, where appropriate movement signals counter any deflection almost instantaneously. The result is a pattern of smooth, non-oscillating movement within the very flexible structure of FIG. 1.

Control of elastic deflection within the flexible structure of each link is accomplished by attaching detection means 25, 26, 27 and 28 to the robot arm linkage. This structure functions to detect any elastic deflection arising within the robot arm. In the illustrated embodiment, a silicon photodiode position sensor 25 and 27 made by Silicon Detector Corporation was utilized. These sensors are designed so that when a spot of light illuminates a region of the active area of the cell, an output voltage can be produced which is linearly proportional to the position of the spot along the axis of the cell. This device is used to precisely measure the location of an optical image with respect to a specified system reference point (the rigid joint 13 and support member 15.) Such detectors are noted for their wide dynamic range. They achieve very accurate analog position measurement over relatively large areas. The response of these detectors is not influenced by the size or shape of the light image as long as this image remains within the active area of the detector. Moreover, operation far from the optical center or no point does not impair accuracy.

The difference between detectors of this type and other photo detectors is that a signal current does not flow through the silicon chip to be collected at the back side. The current flows laterally until collected at ohmic contacts located at the edges of the active area. When a spot of light illuminates a region of the active area, a small forward bias is induced at the illuminated region. This forward bias causes ohmic currents to flow to each of the collecting contacts. The fraction of the total signal current collected at each contact is proportional to the conductance from the point of illumination to that contact. Since the substrate conductance between the spot and a given cathode is inversely proportional to the distance between the spot and that cathode, a signal can be obtained that is proportional to the displacement of the spot from the central axis.

To use this detector as a deflection sensor, a small light source 26, 27 was attached at the controlled joints 13 and 14. The detectors 25 and 28 were then placed at the tip of each link in appropriate alignment. A lens system 29 was used to focus an image of the light source on the detector 25.

Figure 2:
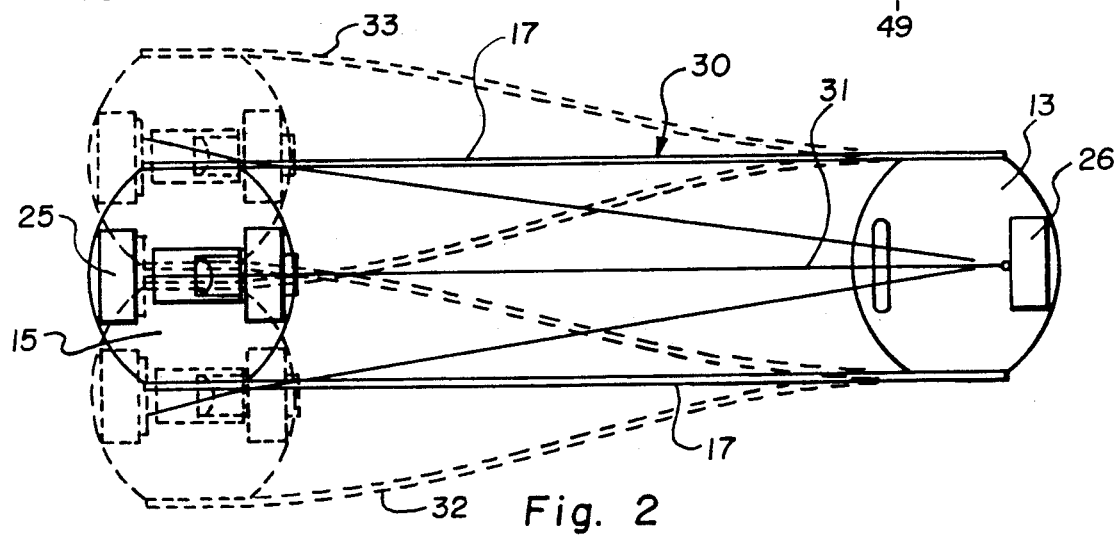
FIG. 2 is a graphic representation of deflection detection within the robot arm of FIG. 1.

FIG. 2 illustrates the operation of the deflection detector with respect to changes of position in the flexible link. In a static condition (without external forces such as gravity) the flexible link 11 has an aligned configuration as illustrated by the solid line representation 30. This orientation is represented by a central axis 31 which intercepts the center portion of the light source 26 and the center of the detector diode 25. With an initial movement of the link in clockwise orientation, inertial deflection of the support member 15 results. In this case, the link structure lags behind the initial movement of the rigid joint 13, resulting in elastic displacement as illustrated by the phantom lines of embodiment 32. As movement of the joint 13 continues, the flexible structure rebounds, adding its return force to the rotating force of the joint 13.

Without deflection feedback control, the flexible link then springs forward of the central axis 31 to assume an advance position 33. The two extreme positions 32 and 33 represent opposing extremities of an oscillation range which gradually dampens as robot arm movement continues. By utilizing the present invention, the image of the light source 26 advancing across the detector constitutes the detecting means which identifies the amount of deflection within the flexible link. The output voltage from this detector is proportional to the amount of actual deflection. This output voltage can be used as a deflection signal which is time dependant and proportional to the degree of elastic deflection of the robot arm.

Figure 3:
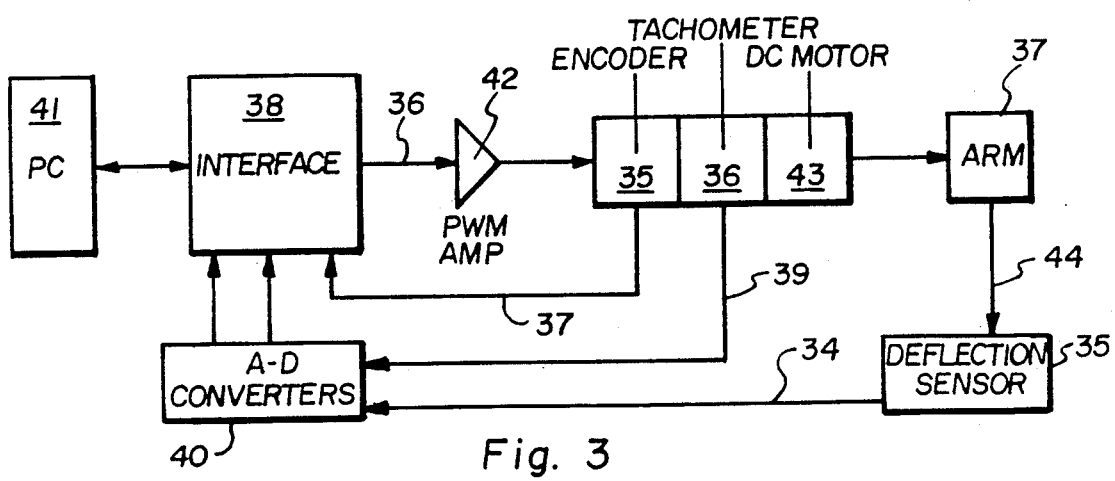
FIG. 3 illustrates a block diagram of system components.

Referring now to FIG. 3, the deflection signal 34 is generated by the deflection sensor 35 which corresponds to the detector 25 in FIG. 3. This signal is sent to the robot computer which includes analog to digital converters and a control algorithm which operates to generate a deflection feedback signal 36 for input to the robot arm 37 wherein the deflection feedback signal is approximately proportional to the deflection signal 34, multiplied by a gain whose value is selected to reduce further elastic deflection within the robot arm. This system includes an interface board for each joint and designed to operate with respect to all DC motors and all of the sensors which control robot arm movement. In this sense, the computer control system receives the deflection signal 34 and generates a deflection feedback signal which is fed directly to each DC motor corresponding to that link in which the deflection occurred.

In summary, therefore, FIG. 3 provides a description of the control loop incorporating both the position and velocity feedback controls, as well as the deflection feedback input. Specifically, item 35 represents the optical encoder utilized for joint position feedback through loop 37 to the computer interface 38. Velocity feedback is generated from the tachometer 36, and is transmitted through line 39 to the analog/digital converter 40 for subsequent input to the interface 38. These two respective feedback loops for position and velocity enable the computer 41 to generate voltage through line 36 and PWM amplifier 42 to DC motor 43. This motor controls arm movement 47.

Deflection feedback is added by the deflection sensor 35 which monitors elastic deflections in the robot arm (represented by arrow 44). The deflection sensor 35 provides a voltage signal through line 34 to the analog digital converter. This signal is fed to the interface 38 and computer 41 for processing by control algorithm which is discussed hereafter. The end result is that the algorithm generates a deflection feedback signal which is introduced via line 36 to the PWM amplifier, and ultimately into the DC motor 43. For example, such a signal responding to an elastic deflection arising from inertial delay of the flexible linkage would generate a deflection feedback signal which imposes a counter voltage at the DC motor which would be approximately 180 degrees out of phase with the elastic deflection occurring in the robot arm. This effectively nullifies or cancels the elastic deflection within the robot arm, thereby reducing further elastic deflection or oscillating movement. By continuously applying this control loop to the robot arm, elastic deflections are nullified and the robot arm essentially moves from position to position without need for waiting periods for oscillations or other forms of elastic deflection to dampen out.

Studies were conducted with respect to the highly flexible robot linkage illustrated in FIG. 1 under both computer simulation and actual experimental use. As can be evidenced by the accompanying figures comparing both simulation and experimental results, the present invention represents a significant and surprising solution to a long-standing problem of elastic deflection within flexible robot arm structures. Although numerous forms of control systems may be utilized to implement the inventive concepts disclosed herein, a representative algorithm and procedure is developed as follows:

Applying Lagrangian mechanics to the robot arm illustrated in FIG. 1, one obtains a relationship between the torques applied at each axis 49 and 50 and the angular displacement of the two links 11 and 12. This results in $$T_1 = [I_1 + 2I_2(1 + \cos\theta_2)](\ddot{\theta}_1 - \ddot{\delta}_1/R) + [I_2(1 + \cos\theta_2)](\ddot{\theta}_2 - \ddot{\delta}_2/R) - (I_2 \sin\theta_2)(\dot{\theta}_2 - \dot{\delta}_2/R)^2 - (I_2 \sin\theta_2)(\dot{\theta}_1 - \dot{\delta}_1/R)(\dot{\theta}_2 - \dot{\delta}_2/R) \quad (51)$$

$$T_2 = [I_2(1 + \cos\theta_2)](\ddot{\theta}_1 - \ddot{\delta}_1/R) + I_2(\ddot{\theta}_2 - \ddot{\delta}_2/R) + (I_2 \sin\theta_2)(\dot{\theta}_1 - \dot{\delta}_1/R)^2 \quad (52)$$

where T is joint torque, I is the link moment of inertia, $\theta$ is the angular joint displacement, $\delta$ is link deflection, R is link length, the subscripts 1 and 2 refer to the first and second links 11 and 12 respectively and a dot signifies differentiation with respect to time. The first two terms in equation (51) result from angular acceleration, the third term results from centrifugal acceleration and the last term is the result of Coriolis acceleration.

The torque applied to each joint is related to the voltage applied to each actuator by $$T_1 = K_1 E_1 - A_1 \ddot{\theta}_1 - C_1 \dot{\theta}_1 \quad (53)$$

$$T_2 = K_2 E_2 - A_2 \ddot{\theta}_2 - C_2 \dot{\theta}_2 \quad (54)$$

where K is a proportionality constant, E is the voltage applied to the actuator, A is the output inertia of actuator and drive train and C is the output damping coefficient for the actuator and drive train. From the theory of elasticity, the joint torques are also related to the link deflections by the equations $$T_1 = I_1 \omega_1^2 \delta_1/R - 0.5 I_2 \omega_2^2 \delta_2/R \quad (55)$$

$$T_2 = I_2 \omega_2^2 \delta_2/R \quad (56)$$

where $\omega$ is the natural frequency of the link.

Equations (51) through (56) provide a nonlinear system which can be solved for the six unknowns, which are the joint displacements, the joint torques and the link deflections, in terms of the voltage applied to the two actuators. The initial conditions to be used with this system are $$\dot{\theta}_1(0) = 0 \quad (57)$$

$$\dot{\theta}_2(0) = 0 \quad (58)$$

$$\theta_1(0) = \theta_{10} \quad (59)$$

$$\theta_2(0) = \theta_{20} \quad (60)$$

$$\dot{\delta}_1(0) = 0 \quad (61)$$

$$\dot{\delta}_2(0) = 0 \quad (62)$$

$$\delta_1(0) = 0 \quad (63)$$

$$\delta_2(0) = 0 \quad (64)$$

where $\theta_{10}$ and $\theta_{20}$ are the initial position of the first and second joints 13 and 14 respectively.

The simulations carried out in this study were obtained from numerical solutions to equations (51) through (56), subject to the initial conditions given in equations (57) through (64). The actuator voltages were computed from the output variables with different control algorithms using a one millisecond sample time.

The control algorithm used in most convention robot systems is given by $$K_1 E_1 = P_1(\theta_{d1} - \theta_1) - V_1 \dot{\theta}_1 \quad (65)$$

$$K_2 E_2 = P_2(\theta_{d2} - \theta_2) - V_2 \dot{\theta}_2 \quad (66)$$

where $\theta_d$ is the desired joint angle, P is the position feedback gain and V is the velocity feedback gain. With control systems of this type, the magnitude of the velocity feedback gain is chosen to prevent control oscillations and the position feedback gain is chosen as large as possible without inducing significant structural oscillations. This control system works well for robots with stiff links as has been applied in state of the art robot systems. However, if the links are flexible, the avoidance structural oscillations requires a position feedback gain so low that the response time is not adequate for most applications. In other words, the actual application of such a robot within a manufacturing process or other form of application consumes so much time that the system is impractical.

After testing many different control algorithms with the computer simulation, it was found that the structural oscillations could be prevented without increasing response time by adding deflection feedback terms to the conventional control algorithm as follows:

$$K_1 E_1 = P_1(\theta_{d1} - \theta_1) - V_1 \dot{\theta}_1 - D_1 \delta_1 - F_1 \dot{\delta}_1 - G_1 \ddot{\delta}_1 \quad (67)$$

$$K_2 E_2 = P_2(\theta_{d2} - \theta_2) - V_2 \dot{\theta}_2 - D_2 \delta_2 - F_2 \dot{\delta}_2 - G_2 \ddot{\delta}_2 \quad (68)$$

where D, F, and G are feedback gains for deflection and its first two time derivatives.

In the results that follow, the control algorithm given by equations (65) and (66) will be referred to as the conventional control system and the control algorithm given by equations (67) and (68) will be referred to as the new control system. The new control system was found to be very robust. The induced vibrations could be effectively eliminated with deflection feedback gains that varied over a very broad range. In fact, the induced vibrations can be eliminated using the very simple case where D is a large positive gain and both F and G are zero. However, with this type of control, very large static position errors are induced when static deflections are caused by body forces such as gravity.

To demonstrate how body force can cause such static position errors, consider the steady solution to equations (67) and (68) under gravitational loading. At steady state, the motor voltage will be equal to that voltage required to balance the static torque caused by gravity, and all time derivatives will go to zero. Thus, we have $$\theta_s = \theta_d - (K/P)E_s - (D/P)\delta_s \tag{69}$$

where $\theta_s$, $E_s$ and $\delta_s$ are the steady state joint position, motor voltage and link deflection respectively. Both the steady state motor voltage and the steady state link deflection are proportional to the gravitational body force. Thus, $$E_s = hg_n \tag{70}$$

$$\delta_s = kg_n \tag{71}$$

where h and k are proportionality constants and $g_n$ is the gravitational component normal to the link. Using equations (70) and (71) in equation (69) yields $$\theta_s = \theta_d - (hK/P + kD/P)g_n \tag{72}$$

The position of the link tip is related to the joint position and the link deflection by this relationship:

$$\theta_t = \theta_s - \delta_s/R \tag{73}$$

where $\theta_t$ is the steady state link tip position. Substituting from equations (71) and (72) in equation (73) gives $$\theta_t = \theta_d - (hK/P + k/R + kD/P)g_n \tag{74}$$

From equation (74) it is apparent that there are three different static position errors resulting from the gravitational body forces acting on the robot. The first static position error shown in equation (74), (h K/P) $g_n$, is independent of link stiffness and occurs even when a conventional control system is used to control a robot with very stiff links. Most robots in use today have no compensation for this error. The error is normally quite small because the position feedback gain is large.

The second static position error is a direct result of link deflection. This is simply the deviation between the tip position and the joint position that results from the elastic deformation of the link under gravitational loading. Because conventional control systems control only on the basis of joint position, they cannot compensate for this error. For robots with very stiff links, this error is very small. However, when the conventional control systems are used to control robots with light weight flexible linkage, this error can be significant.

The last static position error shown in equation (74), (k D/P) $g_n$, is introduced by the deflection feedback term in the new control system. With this control system, if D is chosen to be a large positive gain in order to eliminate the induced vibrations, then the static tip position will significantly deviate from the desired position if there is any static deflection such as that caused by gravity. However, in the absence of gravity and other body forces, these static deflections would not occur. Thus, the simplified control system, obtained by making D a very large positive gain and setting both F and G to zero, would work well for zero gravity applications, such as may occur in space craft and similar environments.

Figure 4:
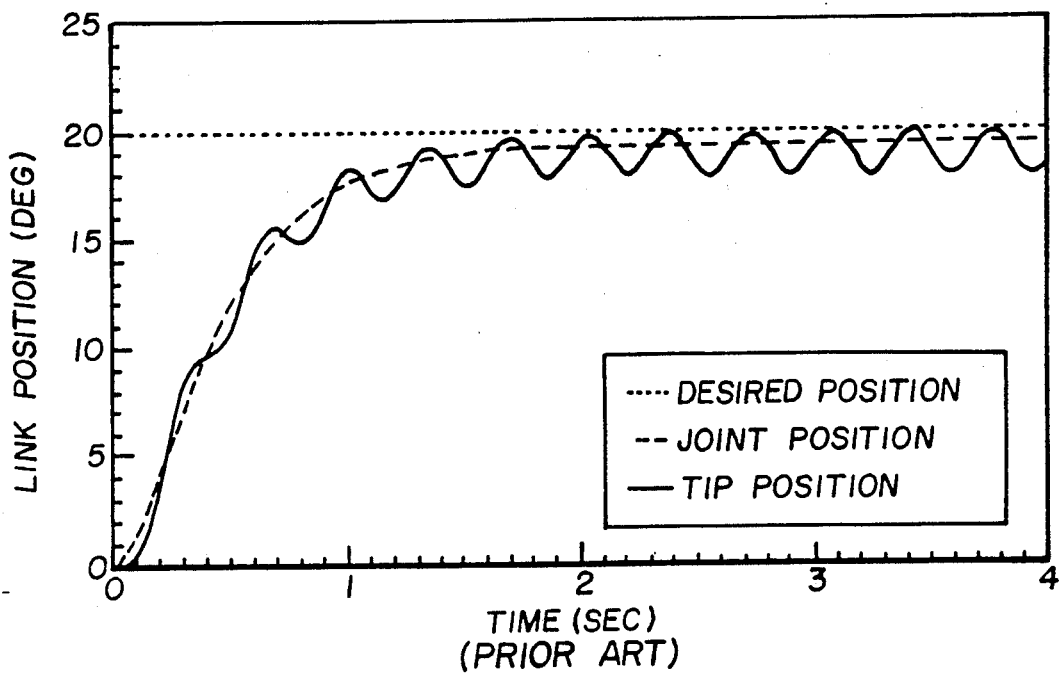
FIG. 4 graphically illustrates gravitational affects on a single link using a conventional control system.
Figure 5:
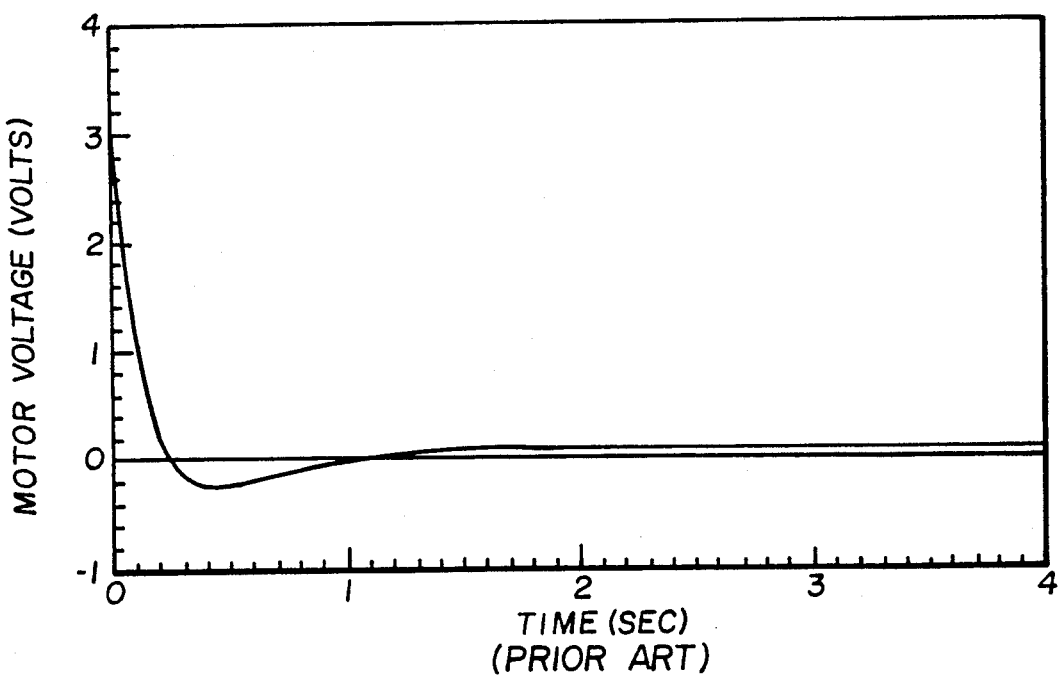
FIG. 5 graphically illustrates gravitational affects on motor voltage for movement of the single link using a conventional control system.

FIGS. 4 and 5 show the link position and motor voltage as a function of time for a typical movement of a single flexible link using the conventional control system. The static position errors can be observed in this figure. The deviation between the equilibrium joint position and the desired position results from the first error term in equation (74). The further deviation between the equilibrium tip position and the equilibrium joint position results from the second error term in equation (74).

Figure 6:
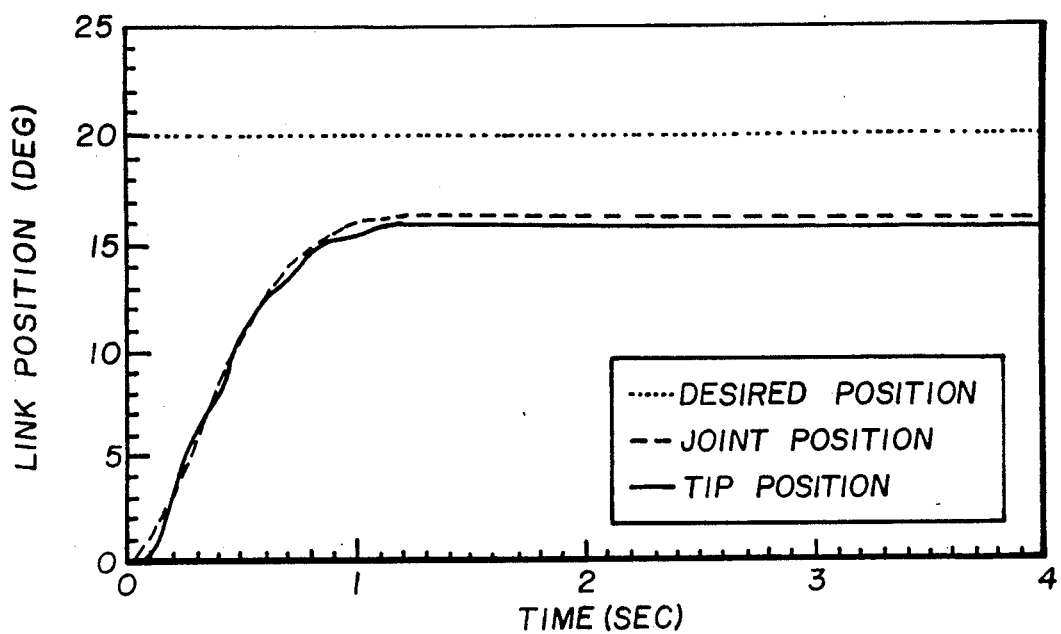
FIG. 6 graphically illustrates gravitational affects on link position for a single link using the new control system of the present invention with $D > 0$, $F = 0$, and $G = 0$.
Figure 7:
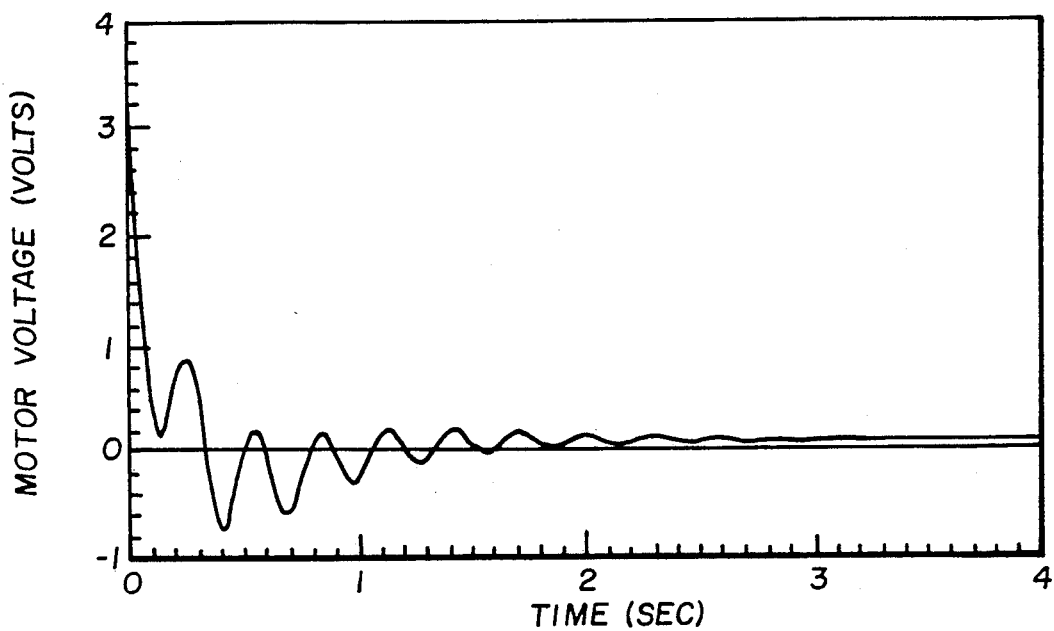
FIG. 7 graphically illustrates gravitational affects on motor voltage for movement of a single link using the new control system with $D > 0$, $F = 0$, and $G = 0$.

FIGS. 6 and 7 show the link position and motor voltage as a function of time for the same movement of this single flexible link using the new control system with D set to greater than zero and both F and G set to zero. Note that, while the induced vibrations are effectively eliminated, the static position error is greatly increased by this type of deflection feedback.

Figure 8:
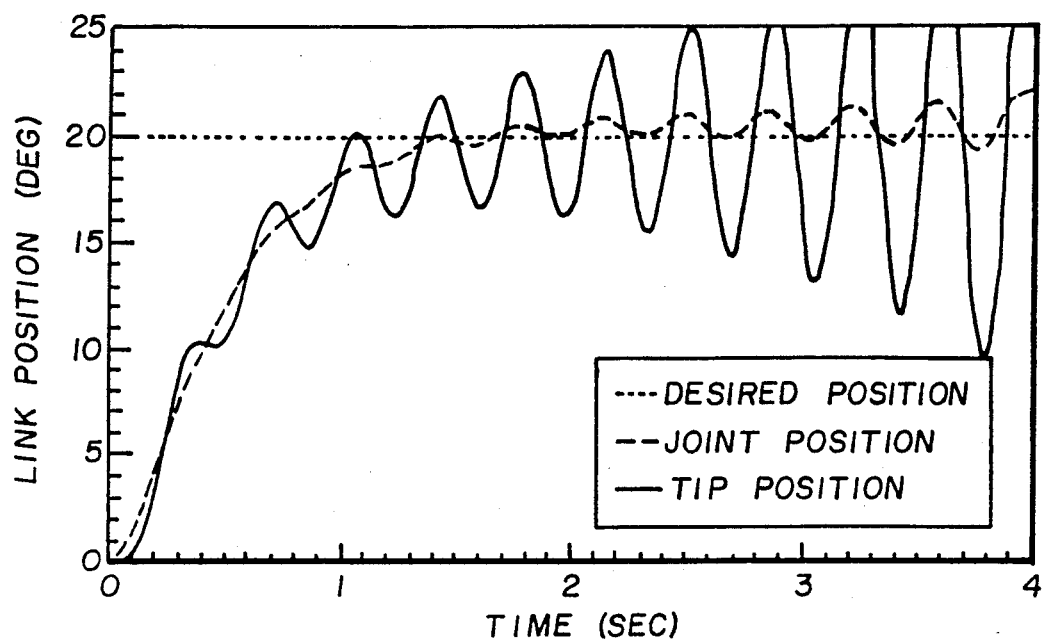
FIG. 8 graphically illustrates gravitational affects on link position for movement of a single link using the new control system with $D < 0$, $F = 0$ and $G = 0$.
Figure 9:
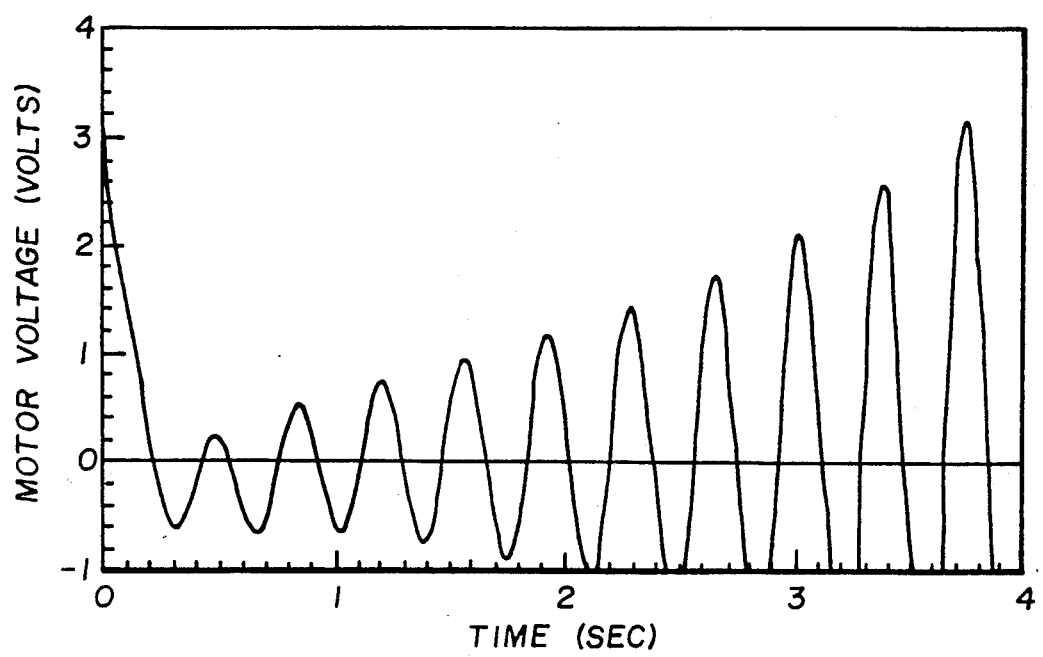
FIG. 9 graphically illustrates gravitational affects on motor voltage for movement of a single link using the new control system with $D < 0$, $F = 0$, and $G = 0$.

Equation (74) can also be used to point out another advantage of the general control system given by equations (67) and (68). If D is chosen as a small negative gain, specifically $$D = -(hK/K + P/R) \tag{75}$$

then, the third error term in equation (74) will be equal in magnitude and opposite in sign to the sum of the other two errors and the net error will be zero. Thus, the steady state tip position will always be the desired position, independent of any static deflections such as those caused by gravity. Furthermore, the errors will cancel regardless of the magnitude of the body forces involved. Such a negative position feedback gain will, however, tend to amplify the elastic link vibrations. This condition is shown in FIGS. 8 and 9.

Figure 10:
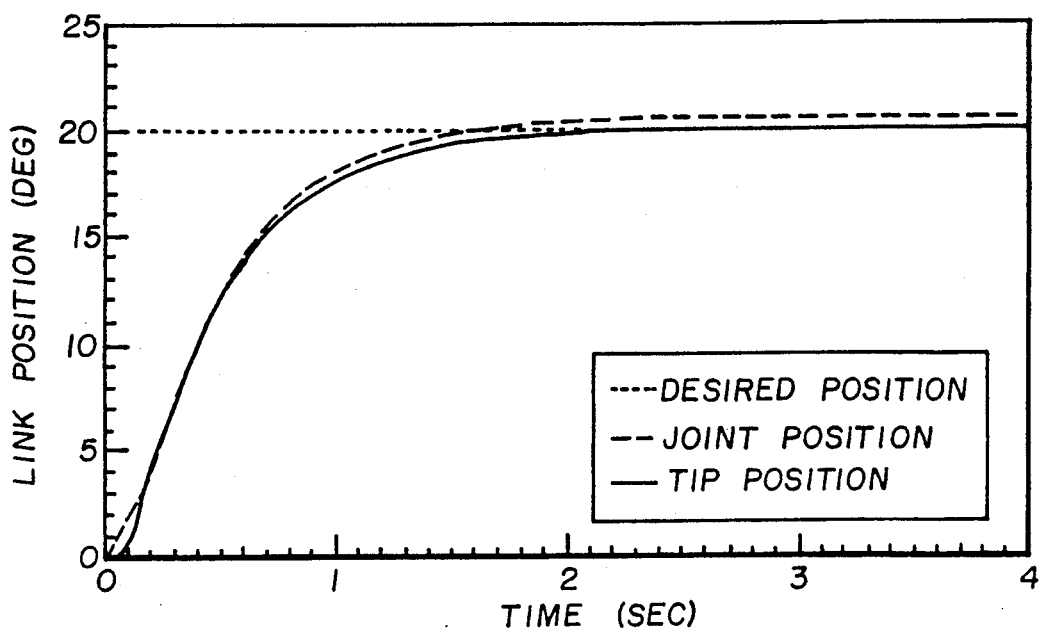
FIG. 10 graphically illustrates gravitational affects on link position for movement of a single link using the new control system with $D < 0$, $F = 0$, and $G < 0$.
Figure 11:
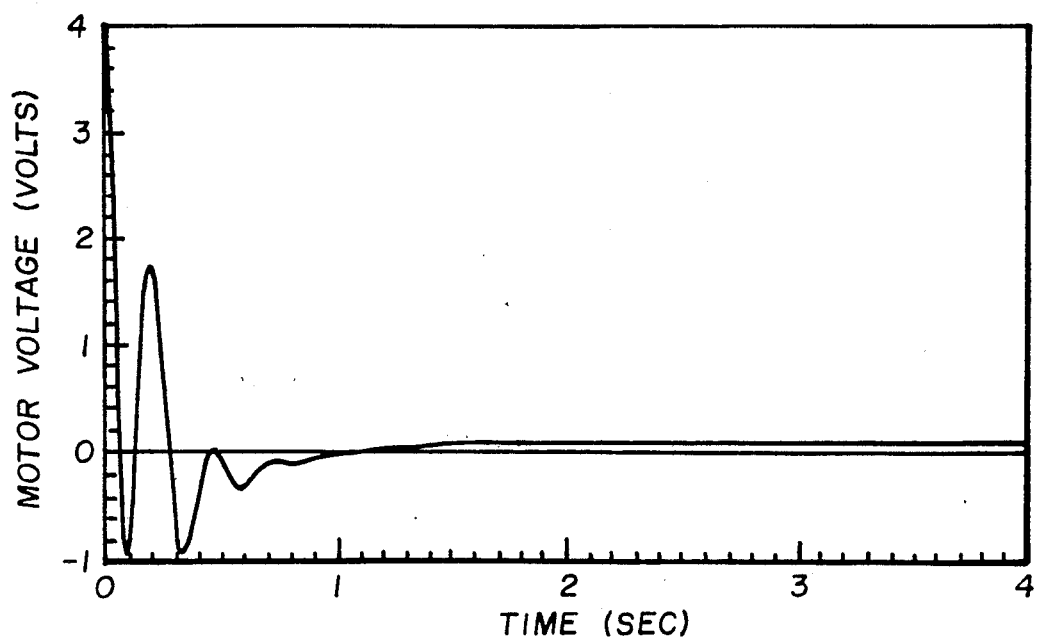
FIG. 11 graphically illustrates gravitational affects on motor voltage for movement of a single link using the new control system with $D < 0$, $F = 0$, and $G < 0$.

If the value of D given by equation (75) is used to eliminate the static position error, then the gains F and G must be chosen to be large enough to eliminate any unwanted induced vibrations. FIGS. 10 and 11 show the condition where D is chosen to eliminate static position error caused by gravity, F is set to zero, and G is selected to be a large enough negative value so that the induced vibrations are eliminated. Note that, in this case, the static error in the joint position is equal and opposite to the static link deflection. Thus, the equilibrium tip position matches the desired position. Some additional improvements in the control can be achieved if non-zero values of F are used.

Figure 12:
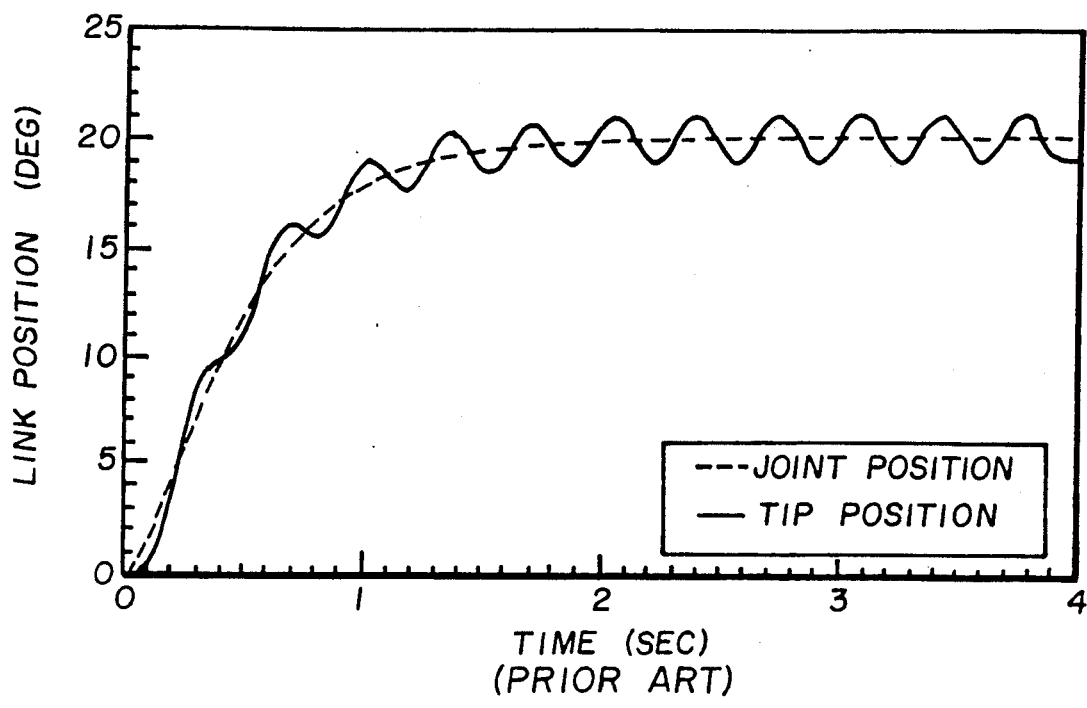
FIG. 12 graphically discloses simulated link position for a single link using conventional position and velocity feedback controls, FIG. 13 graphically illustrates experimental link position for movement of a single link using conventional position and velocity feedback controls.
Figure 13:
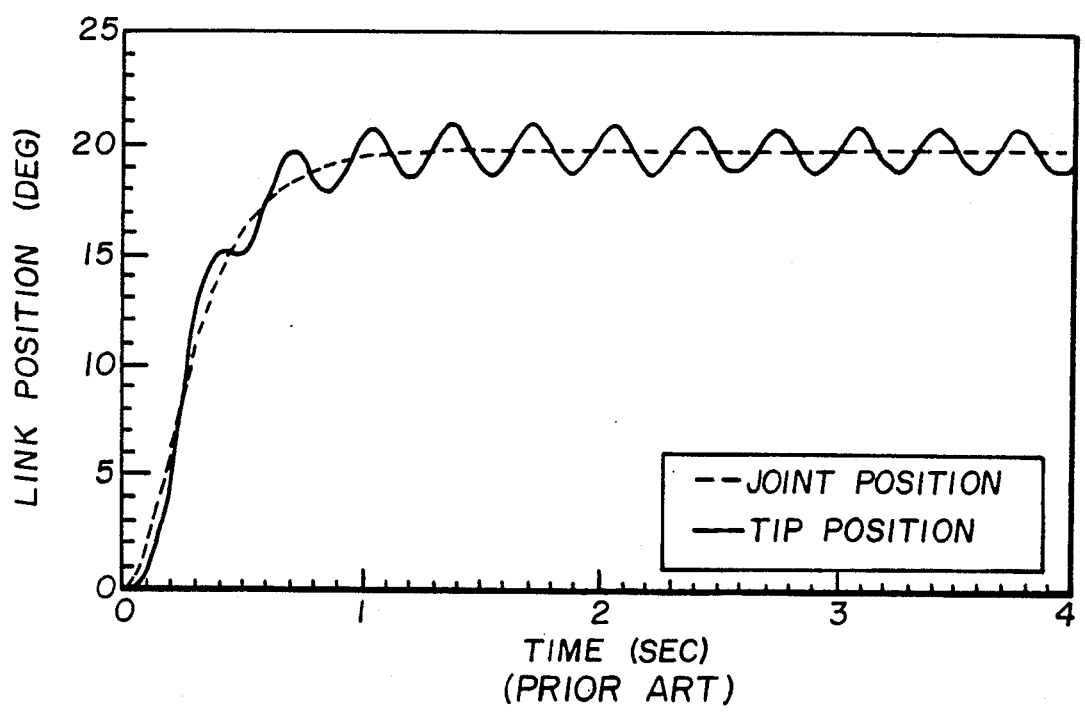

The results of the present study are summarized in FIGS. 12 through 23. These are representative samples of the results obtained in this phase. Many other conditions were also tested but the results were very similar and will not be included in this disclosure. The results shown in FIG. 12 are the link position as a function of time as predicted by the computer simulation using a conventional overdamped robot control system with only position and velocity feedback. FIG. 13 shows the results obtained when this control system was implemented on the test robot. The induced vibrations are very apparent in both figures and the agreement between simulation and experimental testing is excellent.

Figure 14:
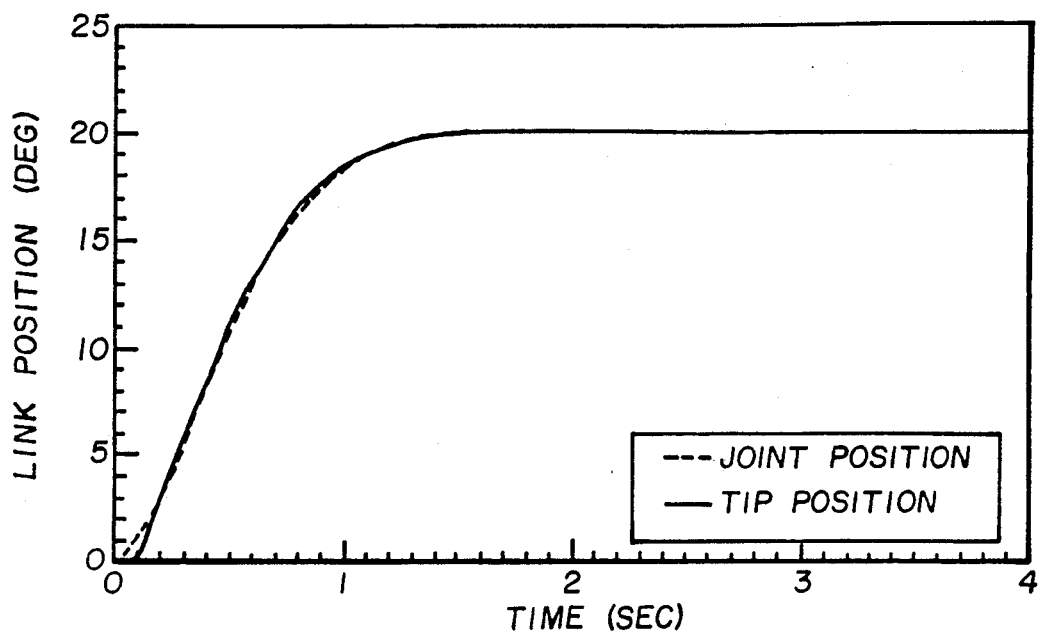
FIG. 14 graphically shows simulated link position for movement of a single link using the new control system with deflection feedback in accordance with the present invention.
Figure 15:
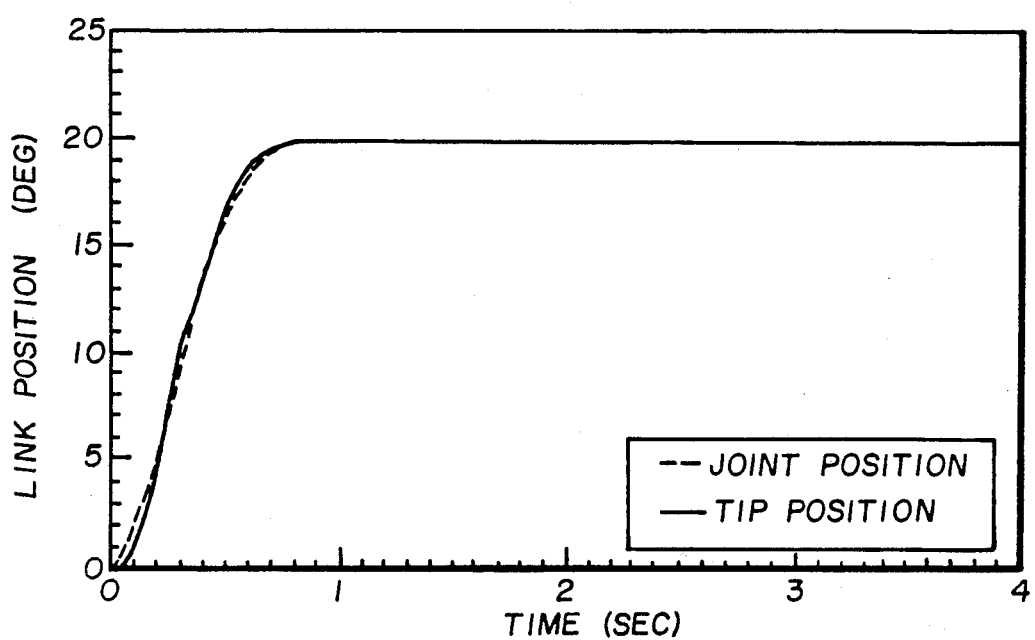
FIG. 15 graphically illustrates experimental link position for movement of a single link using the new control system deflection feedback in accordance with the present invention FIG. 16 graphically illustrates experimental link deflection for an impulse loading at the tip of the single link using conventional position and velocity feedback control.

FIG. 14 shows the results obtained when the same robot is that shown in FIG. 12 was simulated using the new control system which uses deflection feedback as well as position and velocity feedback in the control loop. FIG. 15 shows the results obtained when this control system was implemented on the test robot. Notice that in both the simulation and the experimental test the induced vibrations are eliminated without decreasing the response time. This represents a major improvement over prior art efforts of applying dampening systems to robot arms which result in excessive lag times while oscillation is dampened from the system. Here again, there is good agreement between the simulation and the simulated results.

Figure 16:
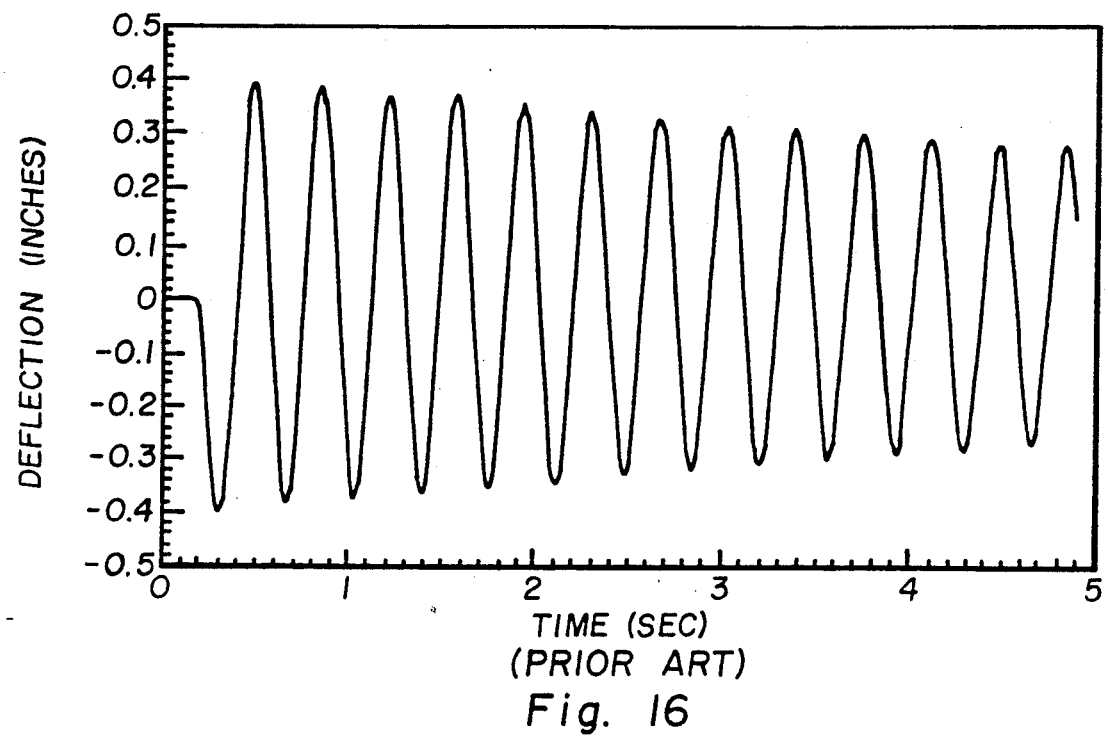
Figure 17:
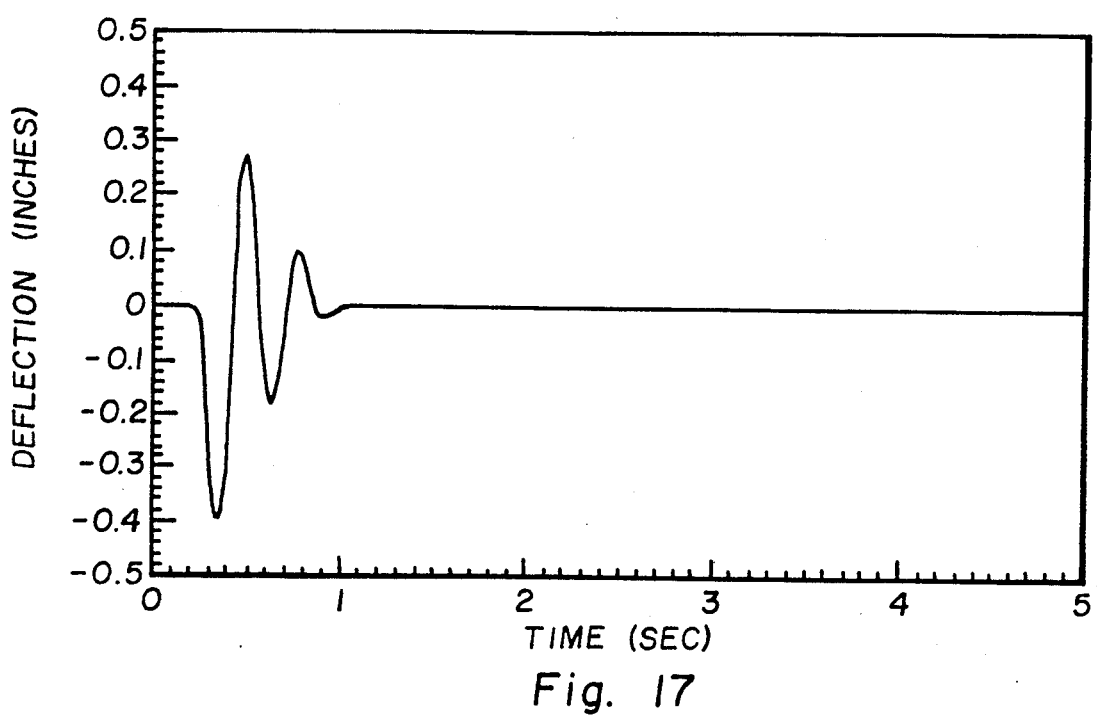
FIG. 17 graphically discloses experimental link deflection for an impulse loading at the tip of a single link using the new control system with deflection feedback.

FIG. 16 shows the link deflection as a function of time that resulted when the tip of the link on the test robot was deflected by a sudden impact. During this test, the link position was being controlled on the conventional control system using only position and velocity feedback. FIG. 17 shows the results of the same test when position was being controlled by the new control system with deflection feedback. Notice that this control system was able to very quickly damp out the vibrations caused by the impact in less than 1 second's time.

Figure 18:
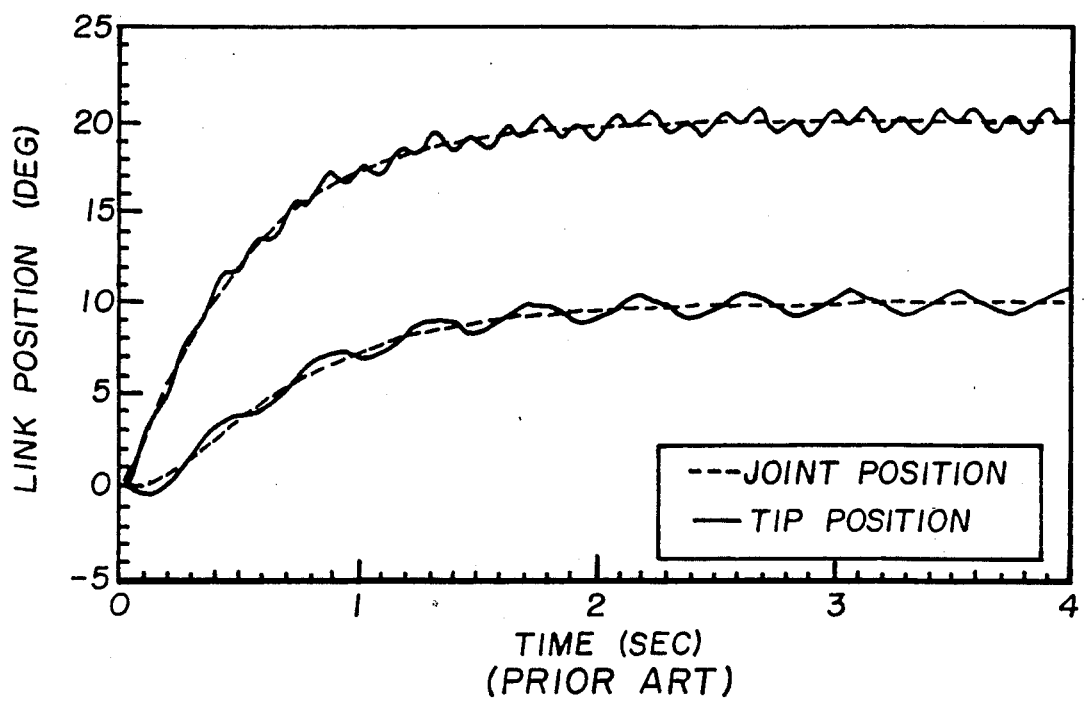
FIG. 18 graphically illustrates simulation of link position for a typical move of a double link arm using conventional position and velocity feedback controls.
Figure 19:
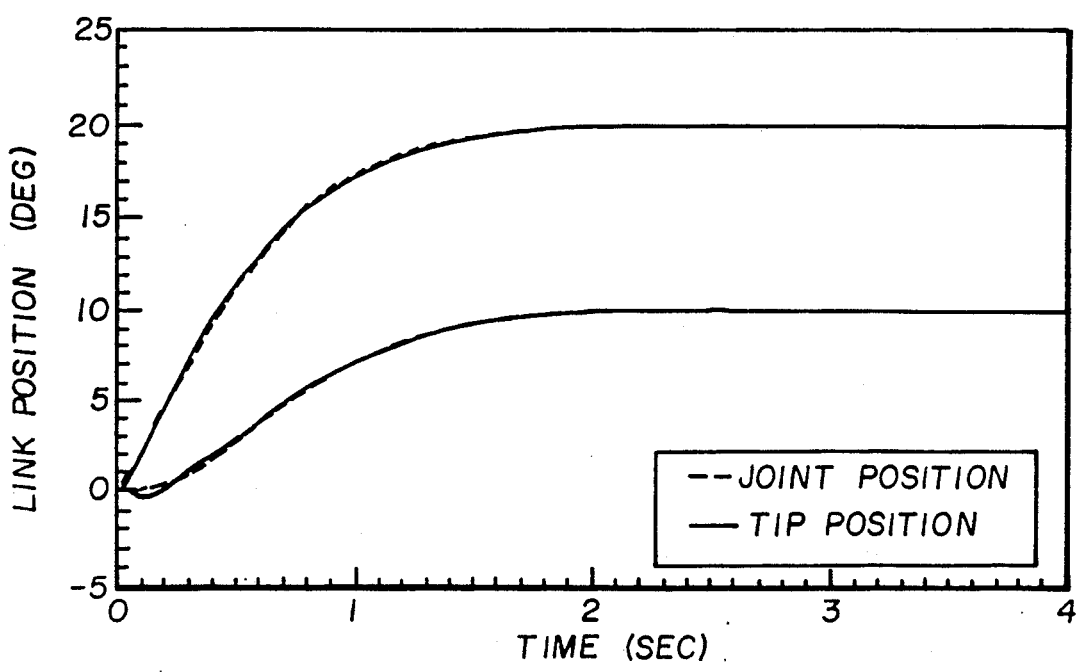
FIG. 19 graphically illustrates simulation of link position for a typical move of a double link arm using the new control system with deflection feedback controls.

FIG. 18 shows a simulation of a typical joint movement on the two axis arm illustrated in FIG. 1 when controlled by the conventional control system. Notice the multiple modes of vibration induced by this control system. FIG. 19 shows a simulation for the same joint movement on the same robot when controlled by the new control system. As can be seen, all modes of vibration are eliminated with no decrease in response time.

Figure 20:
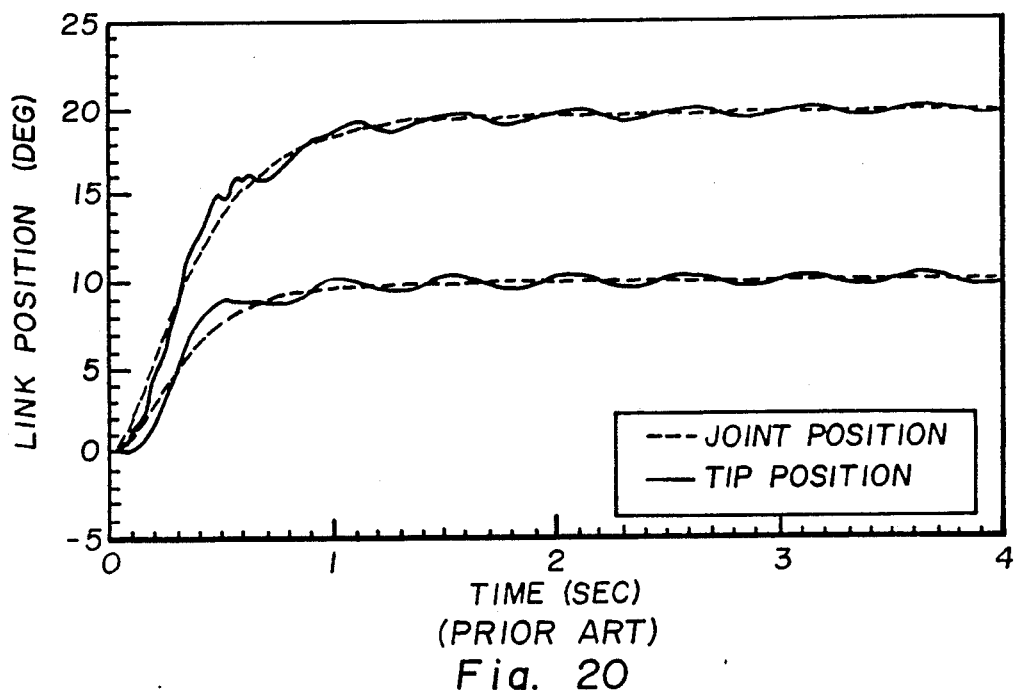
FIG. 20 graphically discloses experimental link position for a typical move of a double link robot arm using conventional position and velocity feedback controls.
Figure 21:
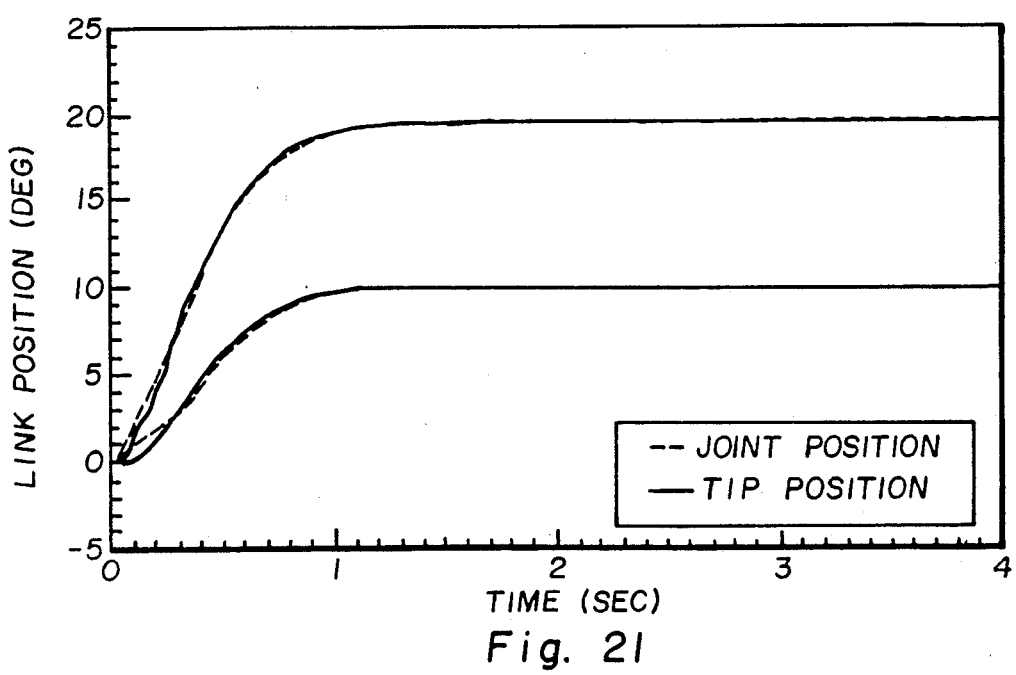
FIG. 21 graphically illustrates experimental link position for a typical move of a double link robot arm using the new control system deflection feedback.

FIG. 20 shows a typical joint movement on the two axis test arm when controlled by the conventional control system. FIG. 21 shows the same joint movement on the test robot when controlled by the new control system. Here again it can be seen that all vibrations are eliminated with no decrease in response time.

Figure 22:
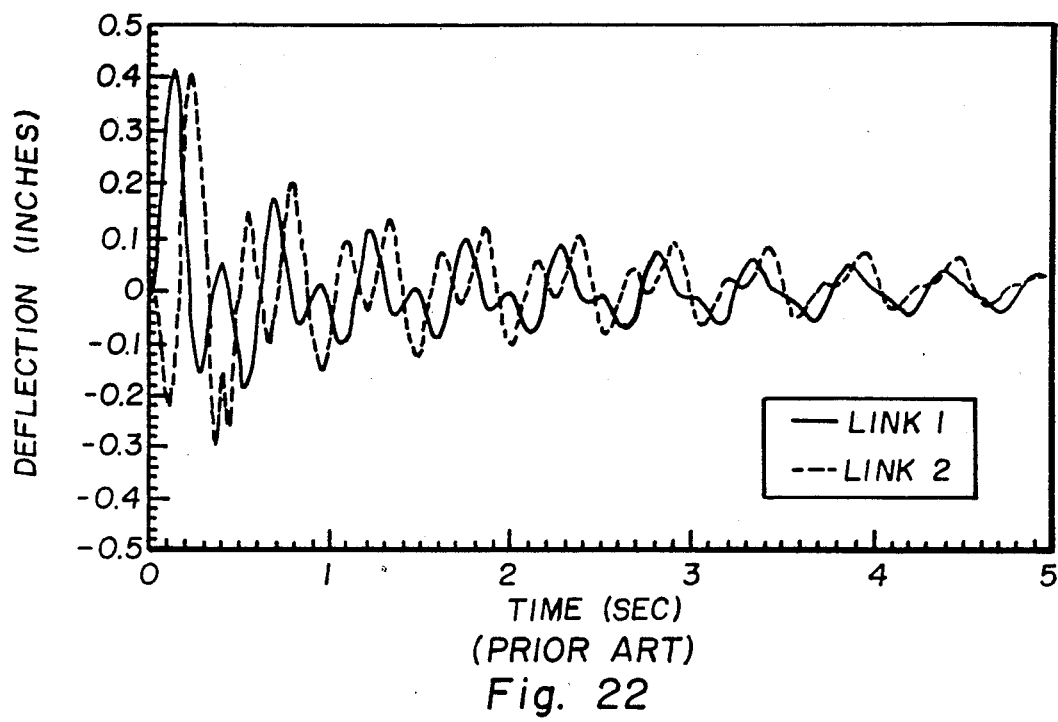
FIG. 22 graphically illustrates experimental link deflection for impulse loading at the tip of a double link robot arm using conventional position and velocity feedback control.
Figure 23:
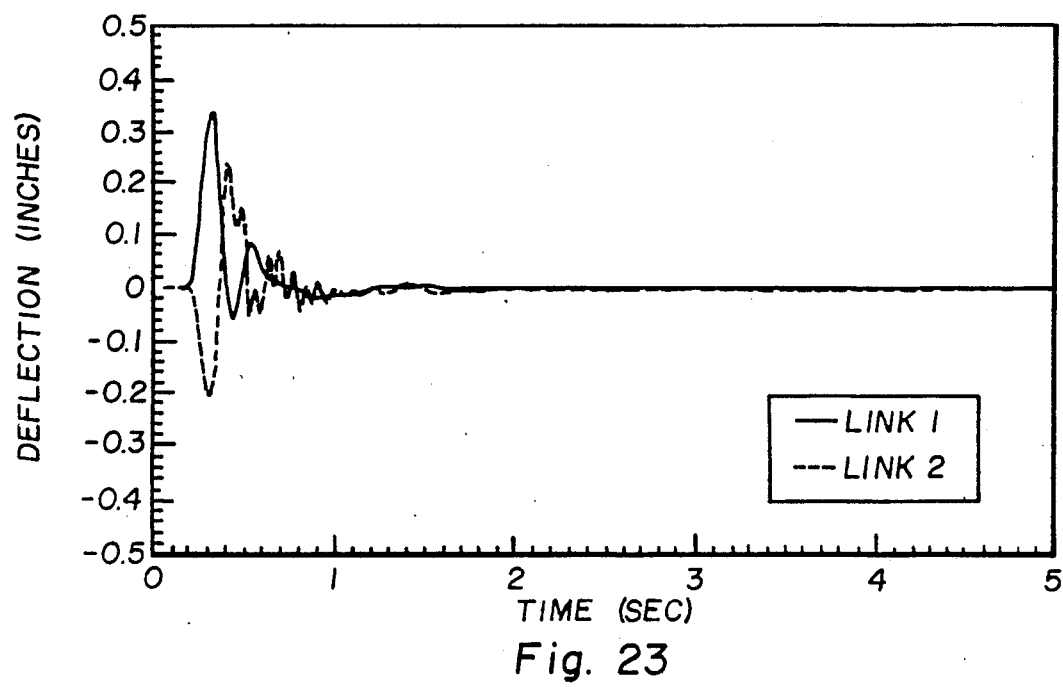
FIG. 23 graphically illustrates experimental link deflection for impulse loading at the tip of a double link robot arm using the new control system with deflection feedback.

FIG. 22 shows the link deflection as a function of time that resulted when the tip of the second link on the test robot was deflected by a sudden impact. During this test the link position was being controlled by the conventional control system using only position and velocity feedback. FIG. 23 shows the results of the same test when position was being controlled by the new control system with deflection feedback. Notice that here again this control system was able to very quickly damp out the vibrations in both links that were caused by the impact. Here again, the required time to damp the oscillation deflection or oscillation was less than one second.

As can be seen by the experimental and simulated results, the application of deflection feedback represents an effective procedure for enabling use of robot arm structure with flexible linkage. This enables the benefits of lightweight robots in an inexpensive system. This represents a major step forward in the state of the art in view of the broadening applications of robots which now may be applied throughout industry and small business, as well as for consumer use.

Accordingly, it is to be understood that the broad concept of this invention includes the special case of detection of any elastic deflection within a robot arm, the generation of time-dependant deflection signals in response to such elastic deflection and the generation of a deflection feedback signal for input into the robot arm, such as through the DC motor 43. This special case would be represented by equations (67) and (68), wherein the gains for the first and second time derivatives were equal to zero. This would be adequate for the test robot arm of FIG. 1 because the support arm structure 17 and 18 is flexible only in the horizontal plane and is therefor substantially unaffected by external forces such as gravity.

The general concept can be applied in numerous situations, in both analog and digital systems and within a variety of structural designs. For example, the method of this invention can be practiced by generating a continuous analog deflection signal which is proportional to the degree of elastic deflection and by continuously generating deflection feedback signals for input to the robot arm by multiplying the analog deflection signal and its first two time derivatives by gains whose values are selected to reduce further elastic deflections within the robot arm. This reduced deflection is accomplished by applying the analog deflection feedback signals to the robot arm through the control motor or by other mechanisms. Application of these deflection feedback signals through the drive motor in an instantaneous manner imposes a counter force in the robot arm which approximates the magnitude of deflection force being applied to cause the elastic deflection. As has been explained, this counter force is applied in opposing direction to the deflection force to at least partially nullify further elastic deflection arising from such deflection force.

Similarly, a digital embodiment can be implemented by generating time dependent digital deflection signals proportional to the degree of elastic deflection. Deflection feedback signals may be generated by multiplying the digital deflection signal and its first two time derivatives by gain whose values are selected to reduce further elastic deflection. Likewise, these digital deflection signals would be applied to the robot arm for reduction of further elastic deflection. In the digital system, this process would be continuously repeated, including the procedures of conventional placement of the repositioning of the robot arm until the arm is located at its desired position. As with the analog signals, the digital feedback signals can be applied directly to the drive motor in instantaneous manner to impose the described counter force in opposing direction to at least partially nullify further elastic deflection arising from the deflection force.

In addition to application within a planar movement path such as the horizontal path illustrated in FIG. 1, the present invention is adapted for application in multiplanar movement paths or three-dimensional applications. As is illustrated in the preceding discussion on algorithm development, the gains associated with deflection and its first and second time derivatives as described in equations (67) and (68) can be chosen to effectively reduce dynamic elastic deflection while at the same time countering the effect of static elastic deflection.

Although the preceding discussions of specific embodiments have referred to generation of voltage signal output which is processed with reverse polarity for the deflection feedback signal for application to the drive motor, it will be apparent to those skilled in the art that other control systems can be adapted to incorporate the inventive principles set forth in this description. It will also be apparent to those skilled in the art that other adaptations and modifications to the inventive principles, methods and structure set forth herein are inherent in this basic disclosure. Accordingly, it is to be understood that the description of specific embodiments set forth herein is not be considered limiting with respect to the following claims.

I claim:

1. A method for controlling and dampening undesirable, vibrational movement within flexible linkage of a robot arm coupled to a moveable, controlled joint and attached drive motor, said method comprising the steps of:

1.1 determining a position displacement required to move the robot arm from the current position to a desired position;

1.2 activating the drive motor to reposition the robot arm to the desired position;

1.3 generating a position feedback signal to enable adjustment of the changing positions of the robot arm to efficiently move the arm toward the desired position;

1.4 detecting any elastic deflection arising within the robot arm;

1.5 generating a time dependent deflection signal proportional to a degree of elastic deflection of step 1.4;

1.6 generating a deflection feedback signal for input to the robot arm wherein the deflection feedback signal is approximately proportional to the deflection signal, multiplied by a gain whose value is selected to reduce further elastic deflection of the robot arm;

1.7 applying the deflection feedback signal to the robot arm to reduce further elastic deflection; and 1.8 continuously performing the procedures of steps 1.3 through 1.7 until the robot arm is properly located in the desired position.

2. A method as defined in claim 1, further comprising the more specific steps of:

2.1 generating a continuous analog deflection signal proportional to the degree of elastic deflection;

2.2 continuously generating a deflection feedback signal for input to the robot arm by multiplying the analog deflection signal by a gain whose value is selected to reduce further elastic deflection of the robot arm;

2.3 applying the analog deflection signal to the robot arm to reduce further elastic deflection within the robot arm.

3. A method as defined in claim 2, wherein step 2,3 of applying the deflection feedback signal to the robot arm comprises the more specific steps of feeding the deflection feedback signal to the drive motor in instantaneous manner to impose a counter force in the robot arm which approximates the magnitude of deflection force being applied to cause the elastic deflection but in opposing direction to at least partially nullify further elastic deflection arising from such deflection force.

4. A method as defined in claim 1, further comprising the more specific steps of:

4.1 generating a time dependent digital deflection signal proportional to the degree of elastic deflection;

4.2 generating a deflection feedback signal for input to the robot arm by multiplying the digital deflection signal by a gain whose value is selected to reduce further elastic deflection of the robot arm;

4.3 applying the digital deflection signal to the robot arm to reduce further elastic deflection within the robot arm; and 4.4 continuously repeating the procedures of 4.1 through 4.3 until the robot arm is properly located in the desired position.

5. A method as defined in claim 1, wherein step 1.7 of applying the deflection feedback signal to the robot arm comprises the more specific steps of feeding the deflection feedback signal to the drive motor in instantaneous manner to impose a counter force in the robot arm which approximates the magnitude of deflection force being applied to cause the elastic deflection but in opposing direction to at least partially nullify further elastic deflection arising from such deflection force.

6. A method as defined in claim 1, wherein the step of detecting deflection within the robot arm comprises the more specific steps of:

6.1 optically monitoring the relative positions of the flexible link with respect to the controlled joint; and 6.2 detecting the degree of elastic displacement of the flexible link out of the relative position corresponding to the degree of elastic deflection.

7. A method as defined in claim 1, wherein the step of detecting deflection within the robot arm comprises the more specific steps of:

7.1 applying strain gages along a flexible length of the robot arm; and 7.2 generating a deflection signal from each of the strain gages which is proportional to the degree of elastic deflection of flexible link.

8. A method as defined in claim 1, further comprising the steps of:

8.1 determining a first time derivative of the deflection detected in step 1.4 corresponding to the velocity of the elastic deflection, 8.2 multiplying the first derivative by a first desired gain, and 8.3 combining the product of 8.2 with the deflection feedback signal of step 1.6 to more efficiently reduce further dynamic elastic deflection while countering the affect of static elastic deflection.

9. A method as defined in claim 8, further comprising the steps of:

9.1 determining a second time derivative of the deflection detected in step 1.4 corresponding to the acceleration of the elastic deflection, 9.2 multiplying the second derivative by a second desired gain, and 9.3 combining the product of 9.2 with the deflection feedback signal of step 1.6 to more efficiently reduce further dynamic elastic deflection while countering the effect of static elastic deflection.

10. A method as defined in claim 1, wherein the position feedback signals and deflection feedback signals comprise voltages to be supplied to the drive motor which values are proportional to the amount of deflection to be applied to the robot arm, said method comprising the specific steps of:

10.1 generating a deflection feedback signal voltage corresponding to an amplitude of the deflection signal of step 1.5;

10.2 reversing polarity of the deflection feedback signal voltage; and 10.3 applying the voltage of step 10.2 to the drive motor.

11. A method as defined in claim 10, further comprising the steps of:

11.1 generating a voltage signal proportional to a first time derivative of the deflection feedback signal of step 10.1, and 11.2 combining the first time derivative voltage with the voltage of the deflection feedback signal; and 11.3 applying this voltage to the drive motor to dampen elastic deflection within the robot arm.

12. A method as defined in claim 11, further comprising the steps of:

12.1 generating a voltage signal proportional to a second time derivative of the deflection feedback signal of step 10.1, and 12.2 combining the second time derivative voltage with the voltage of the deflection feedback signal; and 12.3 applying the to the drive motor to dampen elastic deflection within the robot arm.

13. A method as defined in claim 1, further comprising the step of generating a velocity feedback signal in conjunction with the position feedback signal for enabling more effective adjustment of the changing positions and rate of change for the robot arm.

14. A device for controlling and dampening undesirable vibrational movement within flexible linkage of a robot arm coupled to a moveable, controlled joint and attached drive motor, said device comprising:

14.1 computing means for determining the position displacement required to move the robot arm from the current position to a desired position;

14.2 a drive motor coupled to the robot arm and the computer means to reposition the robot arm to the desired position;

14.3 position feedback means in connection with the computer means for generating a position feedback signal to enable adjustment by the computer means of the changing positions of the robot arm to efficiently move the arm toward the desired position;

14.4 detecting means coupled to the robot arm for detecting any elastic deflection arising within the robot arm;

14.5 deflection signal generating means coupled to the detecting means and computer means for generating a deflection signal dependent in value upon the degree of elastic deflection experienced within the robot arm;

14.6 deflection feedback means in connection with the computer means for generating a deflection feedback signal for input to the robot arm which is proportional to the deflection signal, multiplied by a gain which value is selected to reduce further elastic deflection within the robot arm; and 14.7 counter displacement means for applying the deflection feedback signal to the robot arm to reduce further deflection.

15. A device as defined in claim 14, wherein the robot arm operates in a planar movement path, said detecting means being operable to detect elastic deflection with respect to movement within a plane of robot arm movement.

16. A device as defined in claim 14, wherein the robot arm operates in a multiplanar movement path, said detecting means being operable to detect elastic deflection with respect to three-dimensional movement of the robot arm.

17. A device as defined in claim 14, wherein the robot arm further comprises a plurality of flexible links, each link including a detecting means for detecting elastic deflection within that link and corresponding deflection signal generating means and deflection feedback means as set forth in paragraphs 14.4 and 14.5.

* * * * *